(12) United States Patent
Yamaura et al.

(10) Patent No.: US 8,943,214 B2
(45) Date of Patent: Jan. 27, 2015

(54) COMMUNICATION APPARATUS

(75) Inventors: Takahiro Yamaura, Kanagawa-ken (JP); Shingo Tanaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 13/422,587

(22) Filed: Mar. 16, 2012

(65) Prior Publication Data

US 2012/0233344 A1 Sep. 13, 2012

Related U.S. Application Data

(63) Continuation of application No. PCT/JP2009/004651, filed on Sep. 16, 2009.

(51) Int. Cl.
*G06F 15/16* (2006.01)
*H04L 29/06* (2006.01)
*G06F 12/00* (2006.01)

(52) U.S. Cl.
CPC .............. *H04L 69/16* (2013.01); *H04L 69/161* (2013.01); *H04L 69/164* (2013.01); *H04L 69/162* (2013.01); *G06F 2213/0038* (2013.01)
USPC ........................................................ 709/230

(58) Field of Classification Search
USPC ........................ 709/223–229, 203, 230, 250
See application file for complete search history.

(56) References Cited

U.S. PATENT DOCUMENTS

| | | | |
|---|---|---|---|
| 6,434,620 B1 | 8/2002 | Boucher et al. | |
| 8,549,345 B1 * | 10/2013 | Tripathi et al. | 714/4.1 |
| 2003/0223433 A1 | 12/2003 | Lee et al. | |
| 2004/0215796 A1 * | 10/2004 | Maeda et al. | 709/230 |
| 2005/0111385 A1 * | 5/2005 | Choi | 370/254 |
| 2006/0262796 A1 * | 11/2006 | Biran et al. | 370/392 |
| 2008/0192741 A1 * | 8/2008 | Lee et al. | 370/389 |
| 2008/0279128 A1 * | 11/2008 | Hassan et al. | 370/310 |
| 2009/0063696 A1 * | 3/2009 | Wang et al. | 709/232 |
| 2009/0248891 A1 | 10/2009 | Tanaka | |

FOREIGN PATENT DOCUMENTS

| | | |
|---|---|---|
| JP | 2000-235536 | 8/2000 |
| JP | 2001-339462 | 12/2001 |
| JP | 2003-308262 | 10/2003 |

(Continued)

OTHER PUBLICATIONS

Office Action issued May 21, 2013 in Japanese Patent Application No. P2011-531639 (with English translation).

*Primary Examiner* — Zarni Maung
(74) *Attorney, Agent, or Firm* — Oblon, Spivak, McClelland, Maier & Neustadt, L.L.P.

(57) ABSTRACT

A communication apparatus of one embodiment includes a hardware protocol processing unit, a software protocol processing unit, a hardware protocol process information generating unit to generate protocol process information from the result of the processing by the hardware protocol processing unit, a software protocol process resumption unit to perform control of the software protocol processing unit using the protocol process information generated by the hardware protocol process information generating unit, a software protocol process information generating unit to generate protocol process information from the result of the processing by the software protocol processing unit, and a hardware protocol process resumption unit to perform control of the hardware protocol processing unit using the protocol process information generated by the software protocol process information generating unit.

16 Claims, 14 Drawing Sheets

(56) References Cited

FOREIGN PATENT DOCUMENTS

| JP | 2006-31145 | 2/2006 |
| JP | 2007-142582 | 6/2007 |
| JP | 2008-250496 | 10/2008 |
| JP | 2008-312094 | 12/2008 |

* cited by examiner

| CONDITION NAME | EXPLANATION |
|---|---|
| LISTEN | WAIT FOR CONNECTION REQUEST |
| SYN—SENT | WAIT FOR CONNECTION REQUEST AFTER SENDING OF CONNECTION REQUEST |
| SYN—RECEIVED | WAIT FOR CONFIRMATORY RESPONSE OF CONNECTION REQUEST BETWEEN RECEPTION AND TRANSMISSION AT CONNECTION REQUEST |
| ESTABLISHED | DURING CONNECTION |
| FIN—WAIT—1 | CONNECTION END REQUEST FROM PARTNER TERMINAL, OR WAIT FOR CONFIRMATORY RESPONSE OF CONNECTION REQUEST AFTER TRANSMISSION |
| FIN—WAIT—2 | WAIT FOR CONNECTION END REQUEST FROM PARTNER TERMINAL |
| CLOSE—WAIT | WAIT FOR CONNECTION END REQUEST FROM LOCAL USER |
| CLOSING | WAIT FOR CONFIRMATORY RESPONSE OF CONNECTION END REQUEST FROM PARTNER TERMINAL |
| LAST—ACK | WAIT FOR CONFIRMATORY RESPONSE OF CONNECTION END REQUEST AFTER TRANSMISSION |
| TIME—WAIT | WAIT FOR CONFIRMATORY RESPONSE RECEPTION OF CONNECTION END REQUEST FROM PARTNER TERMINL |
| CLOSED | NONCONNECTION CONDITION |

COMMUNICATION APPARATUS

CROSS REFERENCE TO RELATED APPLICATION

This application is a continuation application based upon the International Patent Application No. PCT/JP2009/004651, filed on Sep. 16, 2009, the entire contents of which are incorporated herein by reference.

FIELD

Embodiments described herein relate to a communication apparatus.

BACKGROUND

Processing of protocols such as TCP/IP (Transmission Control Protocol/Internet Protocol) widely used for the Internet and the like has heretofore been implemented by mainly by software operated on a CPU (Central Processing Unit). However, the recent high-speed network has increased the TCP/IP processing load on the CPU. As a countermeasure against such a problem, there has been proposed a communication apparatus which achieves high-speed communication with dedicated hardware provided for TCP/IP processing. Japanese Patent Application Publication No. 2006-31145 discloses such a communication apparatus.

The communication apparatus described above first determines whether or not data is of high rate. Then, in the case where the data is of high rate, the communication apparatus removes various headers by using the dedicated hardware, and then transfers application data to a memory area. Moreover, in the case of TCP, the communication apparatus hands over only the headers to a network communication driver to perform TCP/IP stack processing with the software.

However, with the communication apparatus described above, frames determined not to be high rate end up having a data link layer and a network layer all processed by the software. Therefore, there is a problem that the processing speed is reduced in processing of segments for establishing a TCP session, for example. Moreover, the software of the communication apparatus also needs to include the functions of processing units of the data link layer and network layer, which are included in the dedicated hardware. As a result, there is a problem of the increased size of the software.

BRIEF DESCRIPTION OF THE DRAWINGS

FIG. 11 is a diagram showing a TCP session state according to Embodiment 2;

DETAILED DESCRIPTION

Figure 1:
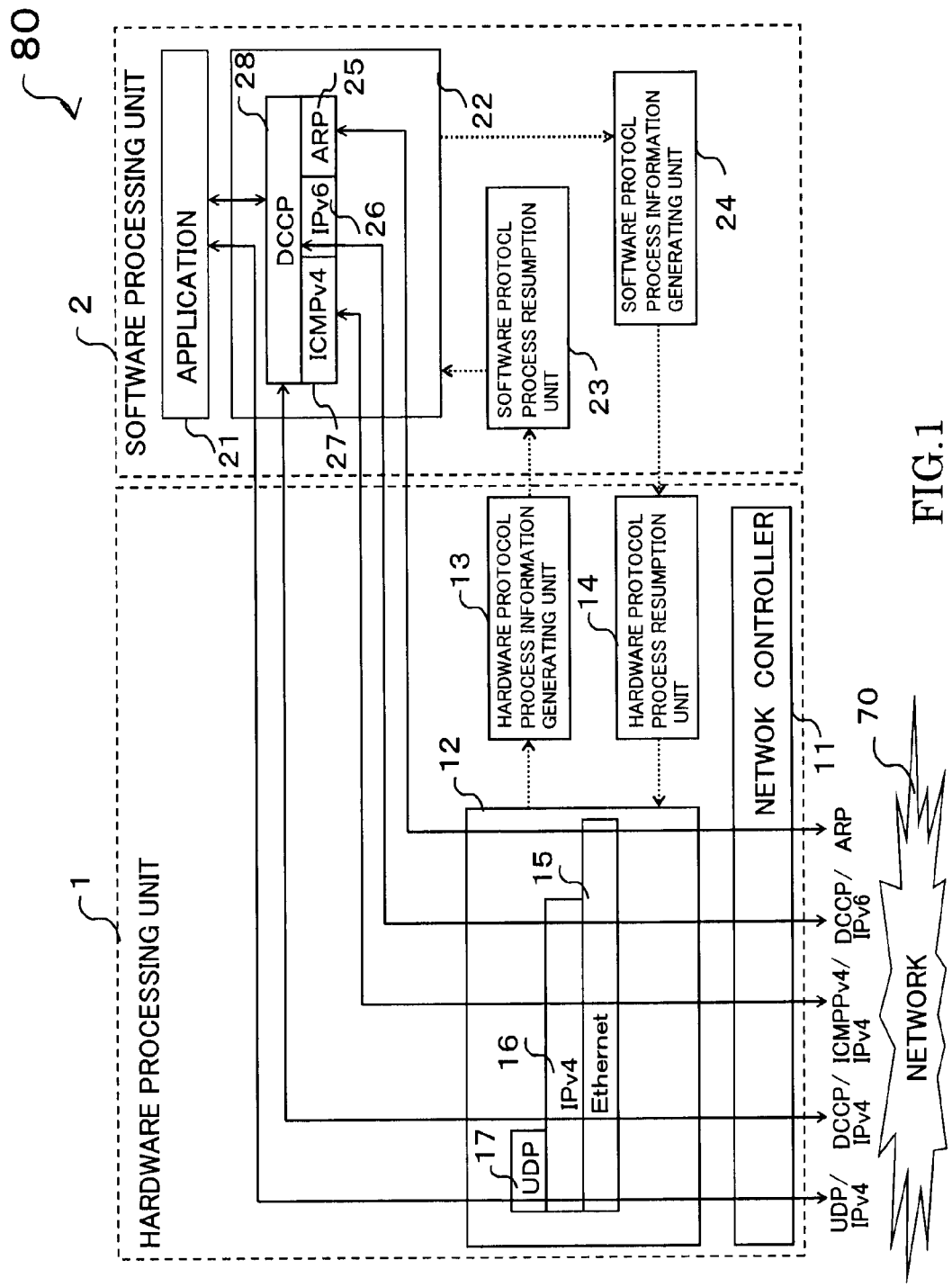
FIG. 1 is a block diagram showing a communication apparatus according to Embodiment 1.

According to one embodiment, a communication apparatus is provided with a hardware protocol processing unit to perform protocol processing using hardware for a frame of received data, a software protocol processing unit to perform protocol processing using software for the frame of the received data, the software protocol processing unit implemented by hardware different from that of the hardware protocol processing unit, a hardware protocol process information generating unit to generate protocol process information, the process information including information which indicates a portion for which the protocol processing is completed by the hardware protocol processing unit, and values which are obtained by the protocol processing performed by the hardware protocol processing unit, and a software protocol process resumption unit to cause the software protocol processing unit to perform the protocol processing not completed by the hardware protocol processing unit, using the protocol process information.

Further embodiments will be described below with reference to the drawings. In the drawings, the same reference numerals denote the same or similar portions.

[Embodiment 1]

Figure 2:
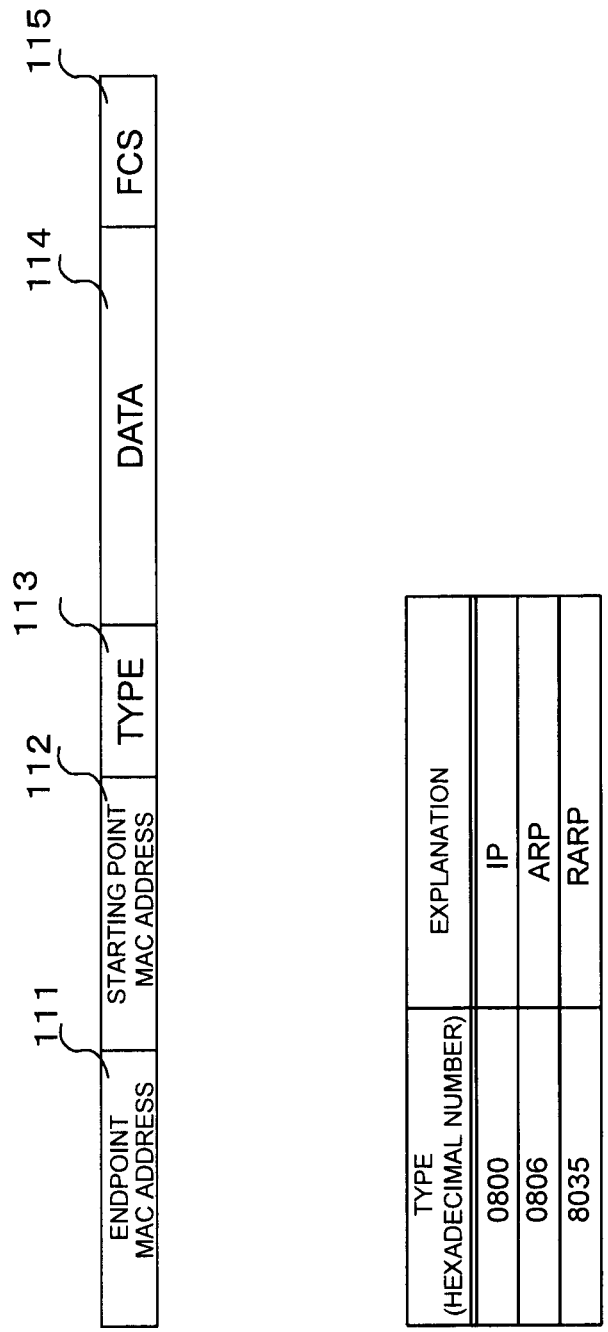
FIG. 2 is a diagram showing a configuration of an Ethernet (R) frame according to Embodiment 1.
Figure 3:
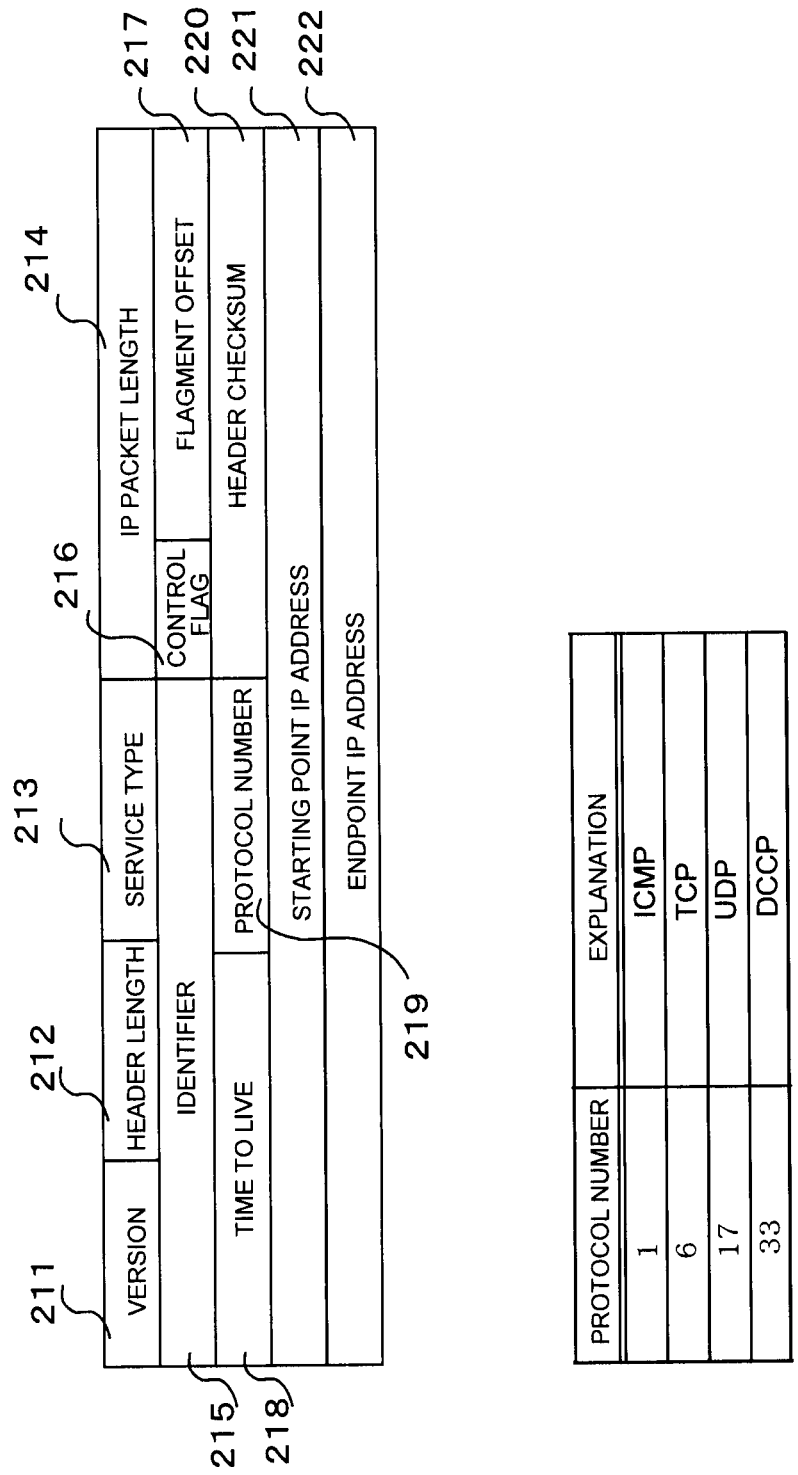
FIG. 3 is a diagram showing a configuration of an IP header according to Embodiment 1.
Figure 4:
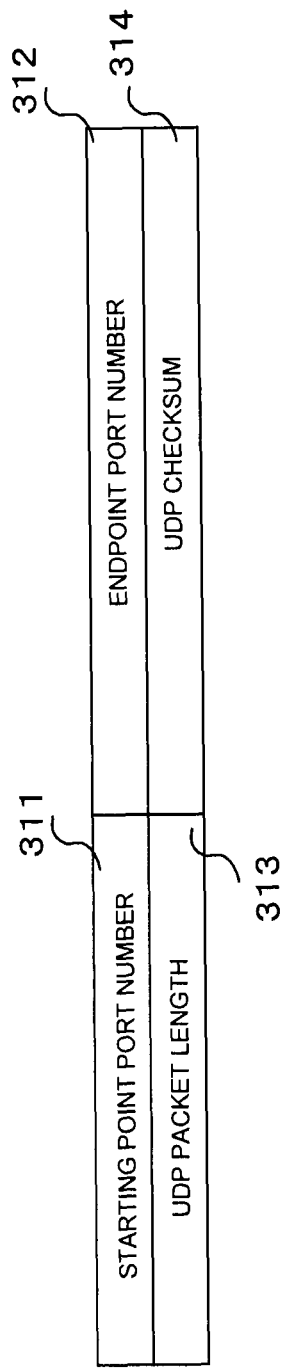
FIG. 4 is a diagram showing a configuration of a UDP header according to Embodiment 1.

First, a communication apparatus according to Embodiment 1 will be described with reference to the drawings. FIG. 1 is a block diagram showing the communication apparatus. FIG. 2 is a diagram showing a configuration of an Ethernet (R) frame. FIG. 3 is a diagram showing a configuration of an IP header. FIG. 4 is a diagram showing a configuration of a UDP header. In the embodiment, a hardware protocol process information generating unit and a software protocol process resumption unit are provided on the reception side. Also, a software protocol process information generating unit and a hardware protocol process resumption unit are provided on the transmission side.

A communication apparatus 80 shown in FIG. 1 is an image transmitting and receiving apparatus, for example. The communication apparatus 80 is connected to a network 70 by the Ethernet (R). The communication apparatus 80 has a function to read image information from a disk device (such as a hard disk drive) and then transmit the image information to a client device connected to the network 70 by the UDP (User Datagram Protocol). The communication apparatus 80 also includes a function to store the image information in the disk device, the image information being received from the client device by the UDP. The communication apparatus 80 includes a hardware processing unit 1 implemented by FPGA (Field Programmable Gate Array), ASIC (Application Specific Integrated Circuit) or the like, and a software processing unit 2 to perform processing with software running on a CPU. That is to say, the hardware processing unit 1 and the software processing unit 2 include different processing functions.

The hardware processing unit 1 includes a network controller 11, a hardware protocol processing unit 12, a hardware protocol process information generating unit 13, and a hardware protocol process resumption unit 14.

Upon receipt of an Ethernet (R) frame from the network 70, the network controller 11 performs processing of an Ethernet (R) physical layer and processing of a part of an Ethernet (R) data link layer. To be more specific, the network controller 11 demodulates a signal specified by the Ethernet (R) standards to take out an Ethernet (R) frame shown in FIG. 2. The Ethernet (R) frame includes an endpoint MAC (Media Access Control) address 111, a starting point MAC address 112, a type 113, data 114, and an FCS (Frame Check Sequence) 115. Next, the network controller 11 performs an FCS checking process to check whether or not the Ethernet (R) frame is corrupted. Note that the endpoint MAC address 111 is also called a destination address, and the starting point MAC address 112 is also called a source address.

In the case of the Ethernet (R) frame, the endpoint MAC address 111 is composed of 6 octets (48 bits), the starting point MAC address 112 is composed of 6 octets (48 bits), the type 113 is composed of 2 octets (16 bits), the data 114 is composed of 46 to 1500 octets, and the FCS 115 is composed of 4 octets (32 bits), for example. The type 113 includes IP (Internet Protocol), ARP (Address Resolution Protocol), and RARP (Reverse Address Resolution Protocol).

In a transmission process, the network controller 11 adds an FCS to the transmission information processed by the hardware protocol processing unit 12, and transmits the information to the network 70 after subjecting the information to frame modulation.

The hardware protocol processing unit 12 includes an Ethernet (R) processing unit 15, an IPv4 (Internet Protocol version 4) processing unit 16, and a UDP processing unit 17. The hardware protocol processing unit 12 executes protocol processing using hardware in reception and transmission.

The Ethernet (R) processing unit 15 performs processing of a part of the Ethernet (R) data link layer. The IPv4 processing unit 16 performs processing of an IPv4 header shown in FIG. 3. The IPv4 header (IP header) includes a version 211, a header length 212, a service type 213, an IP packet length 214, an identifier 215, a control flag 216, a fragment offset 217, a time to live 218, a protocol number 219, a header checksum 220, a starting point IP address 221, and an endpoint IP address 222.

For example, the version 211 is composed of 4 bits, the header length 212 is composed of 4 bits, the service type 213 is composed of 8 bits, the IP packet length 214 is composed of 16 bits, the identifier 215 is composed of 16 bits, the control flag 216 is composed of 3 bits, the fragment offset 217 is composed of 13 bits, the time to live 218 is composed of 8 bits, the protocol number 219 is composed of 8 bits, the header checksum 220 is composed of 16 bits, the starting point IP address 221 is composed of 32 bits, and the endpoint IP address 222 is composed of 32 bits. Note that a 32-bit multiple option is arbitrarily provided. The protocol number 219 includes ICMP (Internet Control Message Protocol), TCP (Transmission Control Protocol), UDP (User Datagram Protocol), and DCCP (Datagram Congestion Control Protocol).

The UDP processing unit 17 performs processing of a UDP header shown in FIG. 4. The UDP header includes a starting point port number 311, an endpoint port number 312, an UDP packet length 313, and an UDP checksum 314. For example, the starting point port number 311 is composed of 16 bits, the endpoint port number 312 is composed of 16 bits, the UDP packet length 313 is composed of 16 bits, and the UDP checksum 314 is composed of 16 bits.

In reception, the hardware protocol process information generating unit 13 generates protocol process information from the result of the processing by the hardware protocol processing unit 12. The protocol process information is outputted to the software processing unit 2. In transmission, on the other hand, the hardware protocol process resumption unit 14 receives protocol process information generated by a software protocol process information generating unit 24. Upon receipt of the protocol process information from the hardware protocol process resumption unit 14, the hardware protocol processing unit 12 performs protocol processing using the hardware.

The software processing unit 2 includes an application 21, a software protocol processing unit 22, a software protocol process resumption unit 23, and the software protocol process information generating unit 24.

The software protocol processing unit 22 executes protocol processing using software in reception and transmission. The software protocol processing unit 22 includes an ARP (Address Resolution Protocol) processing unit 25, an IPv6 (Internet Protocol version 6) processing unit 26, an ICMPv4 (Internet Control Message Protocol version 4) processing unit 27, and a DCCP (Datagram Congestion Control Protocol) processing unit 28. The ARP processing unit 25 performs an ARP process. The IPv6 processing unit 26 performs an IPv6 process. The DCCP processing unit 28 performs a DCCP process.

In reception, the software protocol process resumption unit 23 receives the protocol process information generated by the hardware protocol process information generating unit 13 to control the software protocol processing unit 22. In transmission, on the other hand, the software protocol process information generating unit 24 generates protocol process information from the result of the processing by the software protocol processing unit 22. The protocol process information is outputted to the hardware protocol process resumption unit 14. The hardware protocol process resumption unit 14 controls the hardware protocol processing unit 12 using the received protocol process information.

In transmission, the application 21 performs control to read transmitted data such as image information from an unillustrated disk device. The application 21 includes a function to store received data such as image information in the disk device in reception.

Figure 5:
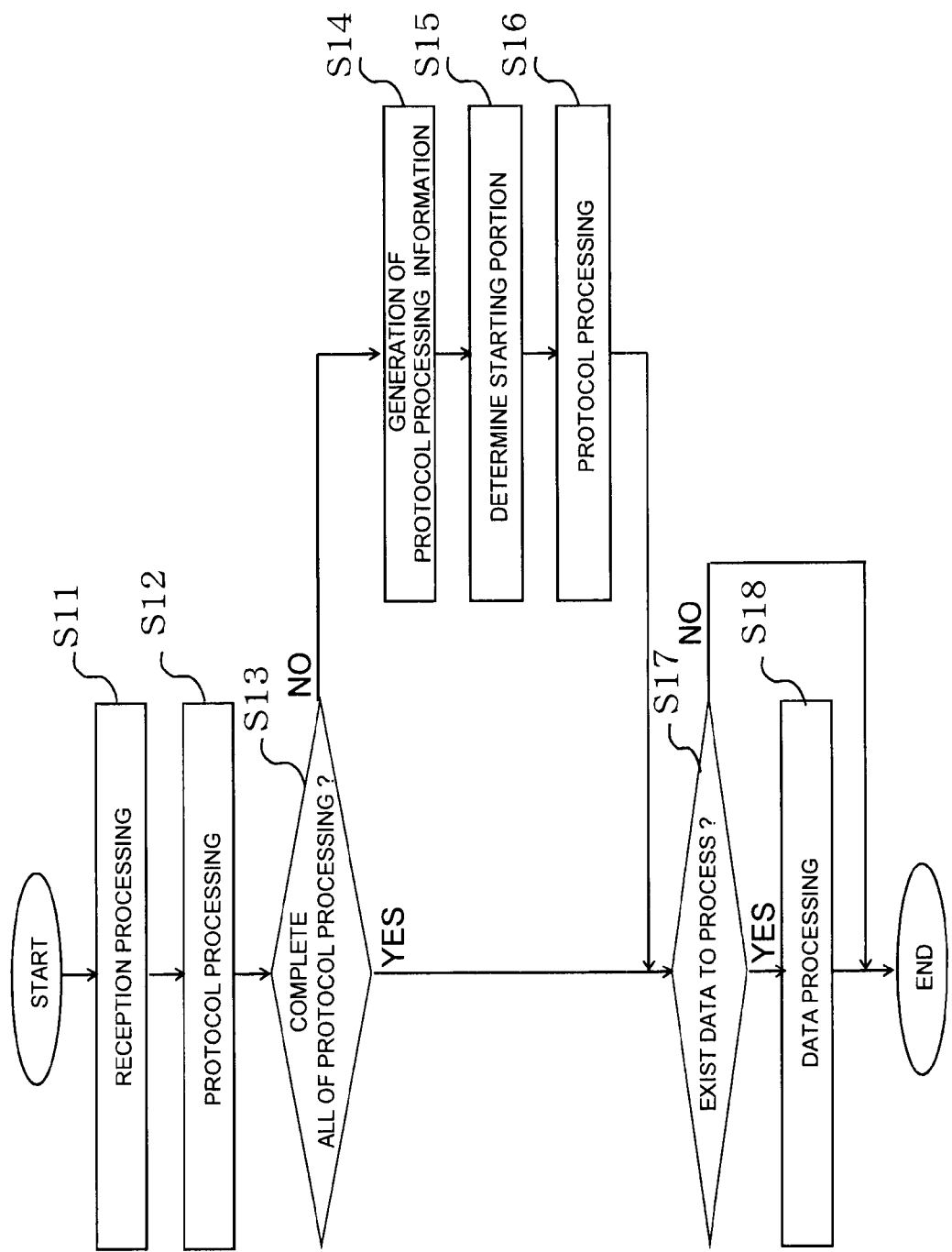
FIG. 5 is a flowchart showing reception processing by the communication apparatus according to Embodiment 1.
Figure 6:
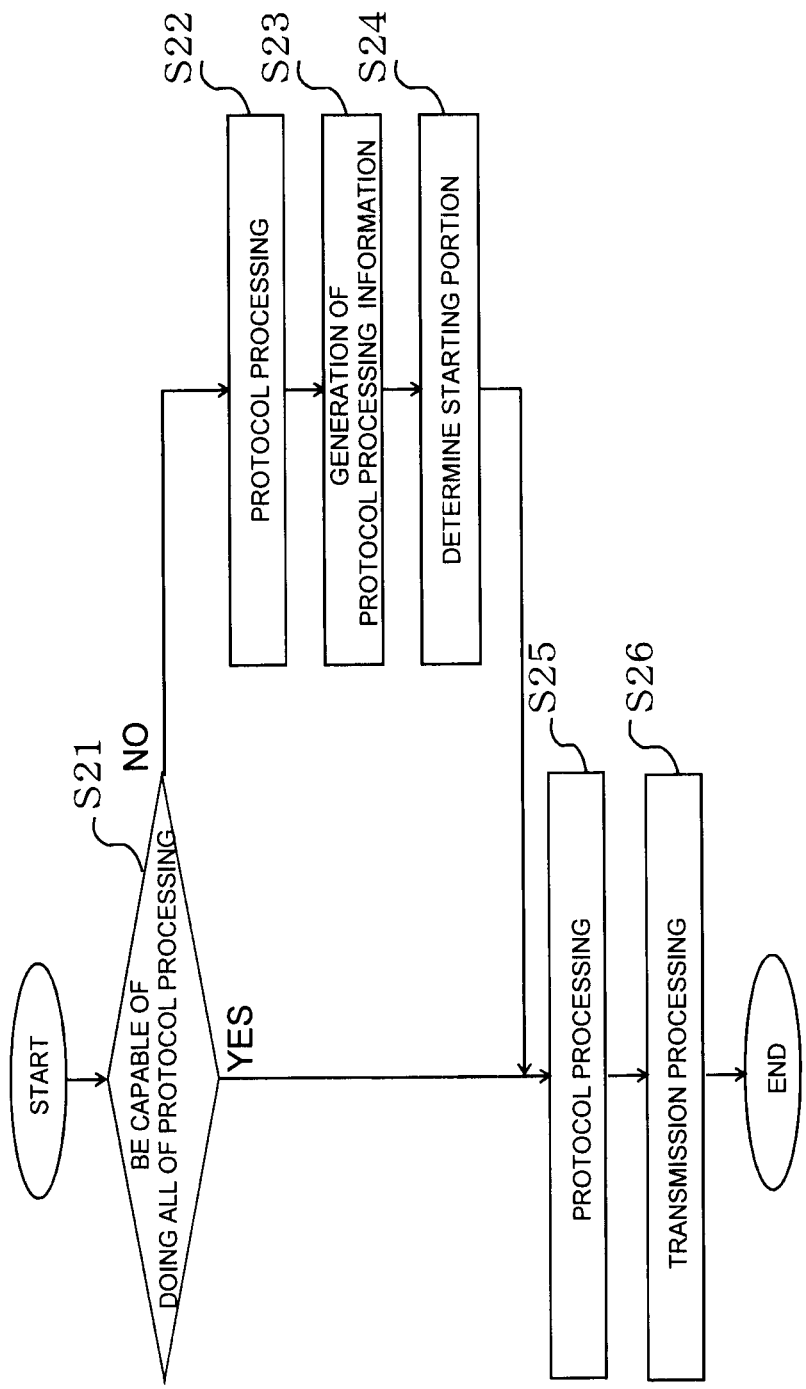
FIG. 6 is a flowchart showing transmission processing by the communication apparatus according to Embodiment 1.

Next, operations of the communication apparatus according to Embodiment 1 will be described with reference to FIGS. 5 and 6. FIG. 5 is a flowchart showing reception procedures by the communication apparatus. FIG. 6 is a flowchart showing transmission procedures by the communication apparatus.

The reception processing by the communication apparatus 80 will be described with reference to FIG. 5. First, data transmitted from the network is inputted to the network controller 11. The network controller 11 performs processing of an Ethernet (R) physical layer and processing of a part of an Ethernet (R) data link layer. To be more specific, the network controller 11 demodulates a received signal specified by Ethernet (R) standards to take out an Ethernet (R) frame (see FIG. 2). Next, the network controller 11 performs a checking process using the FCS 115 to check whether or not the frame is corrupted. When the Ethernet (R) frame corruption is detected, the frame is discarded (Step S11).

Next, in the case where no corruption is detected in the Ethernet (R) frame, the frame is outputted to the hardware protocol processing unit 12. The hardware protocol processing unit 12 performs protocol processing (Step S12). To be more specific, the Ethernet (R) processing unit 15 identifies the destination type by determining, based on the endpoint MAC address 111 of the received Ethernet (R) frame, whether the frame is a frame addressed to the own host, a multicast frame, a broadcast frame or a frame addressed to another host. Moreover, the Ethernet (R) processing unit 15 performs filtering using the starting point MAC address 112 or the endpoint MAC address 111 as needed. In the type 113 of the Ethernet (R) frame, upper layer protocol types (see the type table shown in FIG. 2) are recorded. When the value of the type 113 is IP (=0800), the hardware protocol processing unit 12 continues the processing, and the IPv4 processing unit 16 starts reception processing.

The IPv4 processing unit 16 performs processing of the IPv4 header (see FIG. 3). Even if the type 113 of the Ethernet (R) is IP, the type may sometimes be IPv6. Accordingly, when the value of the version 211 is "6", the hardware protocol processing unit 12 terminates the processing. Then, the hardware protocol process information generating unit 13 is notified that the protocol of the network layer is IPv6, with the result obtained by the Ethernet (R) processing unit 15. When the value of the version 211 is "4", the IPv4 processing unit 16 checks the header length 212 and the IP packet length 214, and also checks the header checksum 220. Moreover, when the IP packet is fragmented, defragmentation processing is performed.

In the protocol number 219 of the IP header, the upper layer protocol type is described (see the protocol number table shown in FIG. 3). When the value of the protocol number 219 is DCCP (=33), ICMPv4 (=1) or the like, the hardware protocol processing unit 12 terminates the processing. On the other hand, when the protocol number 219 is UDP (=17), the hardware protocol processing unit 12 continues the processing, and the UDP processing unit 17 starts reception processing.

The UDP processing unit 17 performs processing of a UDP header (see FIG. 4). The UDP processing unit 17 checks the UDP packet length 313, and checks whether or not the data is corrupted by calculating the UDP checksum 314 of the payload. When the data corruption is detected, the payload is discarded and the processing is terminated.

Subsequently, the hardware protocol processing unit 12 determines whether or not all the protocol processing by hardware processing is completed (Step S13).

In the case where it is determined that all the protocol processing is not completed and the type 113 in the Ethernet (R) frame is ARP (=0806), the hardware protocol processing unit 12 notifies the hardware protocol process information generating unit 13 of the destination type, the upper layer protocol type and the data 114 as the protocol processing result. Moreover, when the value of the IP header is DCCP (=33) or ICMPv4 (=1), the hardware protocol processing unit 12 notifies the hardware protocol process information generating unit 13 of the starting point IP address 221, the endpoint IP address 222, the IP packet length 214, the payload and the like. The hardware protocol process information generating unit 13 generates protocol information from the notified information (Step S14).

Next, the hardware protocol process information generating unit 13 transmits the generated protocol information to the software protocol process resumption unit 23. The software protocol process resumption unit 23 determines a start portion of protocol processing using software (ARP, DCCP, ICMPv4).

Subsequently, the software protocol processing unit 22 instructed to start the protocol processing using software executes protocol processing not performed by the hardware protocol processing unit 12 (Step S16). When the received frame, for example, is ARP, the Ethernet (R) processing has been performed by the hardware protocol processing unit 12. Thus, the ARP header is analyzed, and updating of ARP cache or transmission of ARP response is performed as needed. When the received frames are DCCP and ICMPv4, the Ethernet (R) processing and the IPv4 processing have been performed by the hardware protocol processing unit 12. Thus, DCCP protocol processing and ICMPv4 processing are performed.

When determining that all the protocol processing is completed (or after the protocol processing using software), the software protocol processing unit 22 determines whether or not there is data such as image information to be processed. When it is determined that there is no data to be processed, the reception processing is terminated (Step S17). On the other hand, it is determined that there is data to be processed, the application 21 executes processing of storing the received data in the disk device (Step S18). When all the protocol processing by the hardware protocol processing unit 12 is completed with the received Ethernet (R) frames, the application 21 performs processing of storing the data such as image information in the disk device.

As described above, when the received Ethernet (R) frames include the protocol (such as ARP, DCCP and ICMPv4) that cannot be processed by the hardware protocol processing unit 12, the protocol process information obtained from the result of the processing by the hardware protocol processing unit 12 is notified to the software protocol processing unit 22. Upon completion of the protocol processing using software, the software protocol processing unit 22 hands over data, if there is any, to the application 21, and the application 21 stores the received data such as the image information in the disk device.

In this event, the protocol process information described above includes information subjected to the protocol processing by the hardware protocol processing unit 12, the values obtained by the protocol processing, and the like. Therefore, the software protocol processing unit 22 performs processing of unprocessed protocols rather than performing processing for the protocols already processed by the hardware protocol processing unit 12.

Next, transmission processing by the communication apparatus 80 will be described with reference to FIG. 6. In the transmission processing, when the software protocol processing unit 22 performs transmission, there are the following three cases, for example. The first case is where a response packet is transmitted when ARP and ICMPv4 are processed by the reception processing described above. The second case is where an ARP request packet is actively transmitted to find out a MAC address of the other apparatus. The third case is where packets are transmitted from the application 21. Here, description will be given by taking the case of data transmission by the application 21 or the software protocol processing unit 22 as an example.

The transmission processing by the communication apparatus 80 will be described with reference to FIG. 6. First, data such as image information is read from the disk device by the application 21. The application 21 generates the starting point port number 311, the endpoint port number 312, and UDP packet length 313 of the UDP, the version 211, the service type 213, the IP packet length 214, the identifier 215, the control flag 216, the time to live 218, the starting point IP address 221, and the endpoint IP address 222 of the IP, the starting point MAC address 112 and the endpoint MAC address 111 of the Ethernet (R), and network MTU (Maximum Transmission Unit), all of which are required to perform the protocol processing. The protocol process information described above is notified to the software protocol processing unit 22. The software protocol processing unit 22 determines whether or not all the protocol processing to perform the transmission can be executed by the hardware protocol processing unit 12.

When determining that the processing cannot be performed by the hardware protocol processing unit 12 (e.g., when a packet subjected to ICMPv4 reception processing is to request for an echo response), the software protocol processing unit 22 generates an ICMPv4 echo response packet. Moreover, the software protocol processing unit 22 generates and transmits an ARP response packet when receiving an ARP request packet. Note that when the application 21 does not specify the values in the protocol process information, fixed values held by the software protocol processing unit 22 may be set and included in the protocol process information, or a result of active resolution by transmitting an ARP request packet may be used (Step S22).

Next, the software protocol process information generating unit 24 generates protocol process information including information indicating that the protocol processing higher than IPv4 is completed, the starting point IP address 221, the endpoint IP address 222 and the protocol number 219, which are required to perform the IPv4 processing, the starting point MAC address 112, the endpoint MAC address 111, and the payload and payload length, which are required to perform the Ethernet (R) processing. Moreover, the software protocol process information generating unit 24 also generates, as the protocol process information, the starting point MAC address 112, the endpoint MAC address 111 and the type 113, which are required for processing of the Ethernet (R) that is the lower layer, and the information indicating that the protocol processing up to ARP is completed (Step S23).

Subsequently, the software protocol process information generating unit 24 transmits the generated protocol process information to the hardware protocol process resumption unit 14. The hardware protocol process resumption unit 14 determines to start the protocol processing using hardware (Step S24).

When it is determined that the hardware protocol processing unit 12 can perform all the protocol processing (or after it is determined that the protocol processing using hardware is to be started), the UDP processing unit 17 sets the values included in the notified protocol process information as the starting point port number 311, the endpoint port number 312 and the UDP packet length 313 of the UDP header. The UDP processing unit 17 also generates a UDP header by calculating the UDP checksum 314 from the header and data.

Next, the IPv4 processing unit 16 performs processing of fragments as needed and thus sets the values of the identifier 215, the control flag 216 and the fragment offset 217 for each packet. The IPv4 processing unit 16 also sets the values other than the header checksum 220 of the IP header. Lastly, the header checksum 220 is calculated to set a value in the checksum field.

Then, the Ethernet (R) processing unit 15 sets the starting point MAC address 112, the endpoint MAC address 111 and the type 113 of the Ethernet (R) frame. Moreover, the Ethernet (R) processing unit 15 performs Ethernet (R) protocol processing (Step S25). Thereafter, the network controller 11 adds the FCS 115 to the Ethernet (R) frame, and transmits the modulated Ethernet (R) frame to the network 70 (Step S26).

When the packet is transmitted from the application 21 or the software protocol processing unit 22 as described above, the software protocol processing unit 22 determines whether or not all the protocol processing to perform the transmission can be executed by the hardware protocol processing unit 12. When all the processing is determined to be executable, the transmitted data is outputted to the network controller 11 from the hardware protocol processing unit 12. The network controller 11 transmits the data to a destination apparatus through the network 70.

On the other hand, when all the processing is determined not to be executable, the software protocol processing unit 22 performs transmission protocol processing. Furthermore, the software protocol process information generating unit 24 generates protocol process information, and the protocol process information is transmitted to the hardware protocol processing unit 12 through the hardware protocol process resumption unit 14. In this event, the protocol process information includes the information indicating a portion subjected to the protocol processing by the software protocol processing unit 22, the values obtained by the protocol processing, and the like. The hardware protocol processing unit 12 processes only the protocol not processed by the software protocol processing unit 22. In the case where the frame to be transmitted, for example, is ARP, the hardware protocol processing unit 12 can perform Ethernet (R) processing. Thus, the software protocol processing unit 22 performs only the ARP processing, and the hardware protocol processing unit 12 performs Ethernet (R) processing. In the case where the frame to be transmitted is DCCP or ICMPv4, the hardware protocol processing unit 12 can perform Ethernet (R) and IPv4 processing. Thus, the software protocol processing unit 22 performs only DCCP or ICMPv4 processing, and the hardware protocol processing unit 12 performs IPv4 and Ethernet (R) processing.

Figure 7:
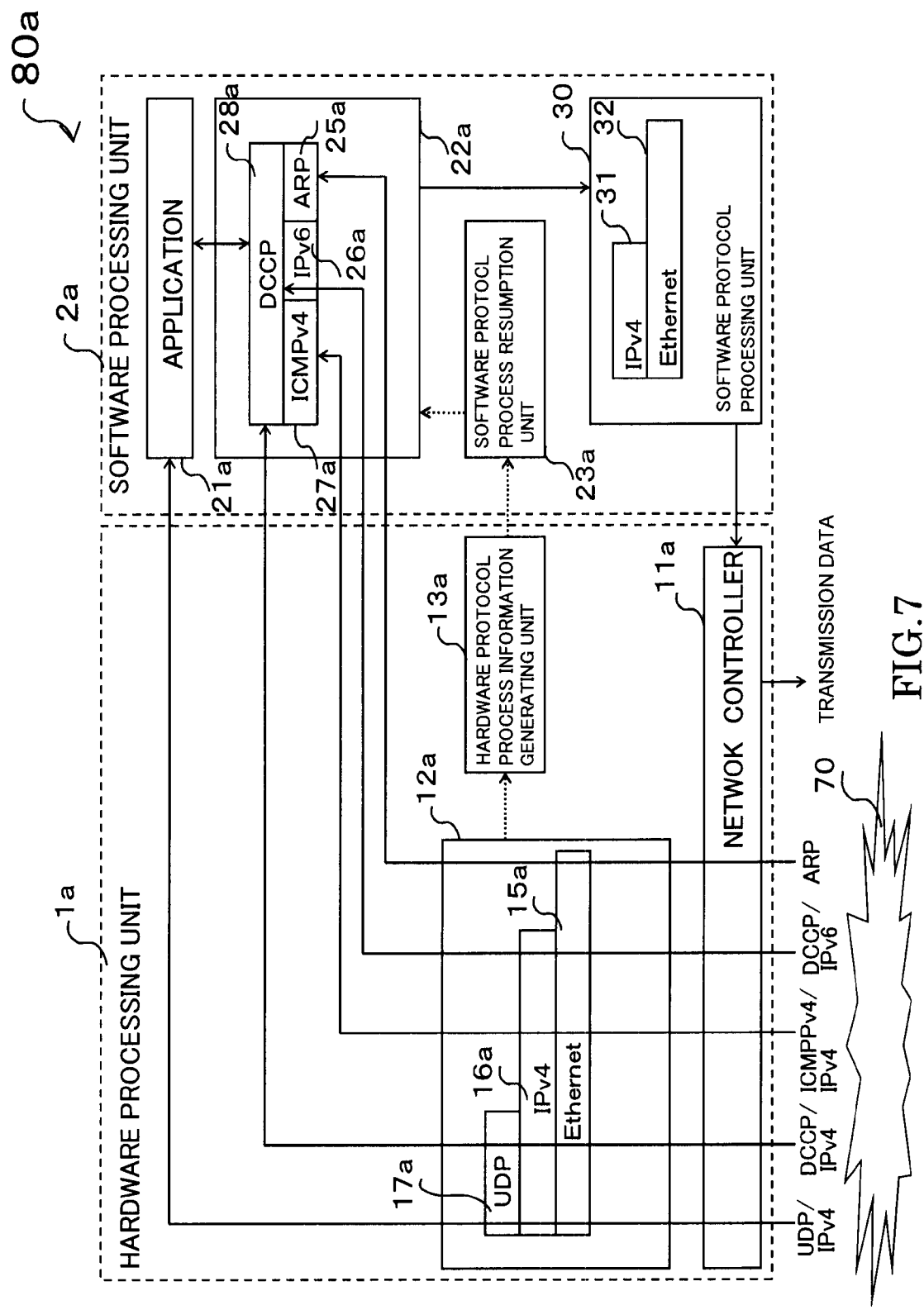
FIG. 7 is a block diagram showing the communication apparatus with faster UDP reception according to Embodiment 1.

FIG. 7 shows a first modification of Embodiment 1. A communication apparatus 80a of the first modification includes a hardware processing unit 1a and a software processing unit 2a. The hardware processing unit 1a includes a network controller 11a, a hardware protocol processing unit 12a, and a hardware protocol process information generating unit 13a. The hardware protocol processing unit 12a includes an Ethernet (R) reception processing unit 15a, an IPv4 reception processing unit 16a, and a UDP reception processing unit 17a. The software processing unit 2a includes an application 21a, a software protocol processing unit 22a, a software protocol process resumption unit 23a, and a software protocol processing unit 30. The software protocol processing unit 22a includes an ARP processing unit 25a, an IPv6 processing unit 26a, an ICMPv4 processing unit 27a, and a DCCP processing unit 28a. The software protocol processing unit 30 includes an IPv4 transmission processing unit 31 and an Ethernet (R) transmission processing unit 32.

In the first modification described above, the hardware protocol process information generating unit 13a and software protocol process resumption unit 23a to deal with the reception are provided in the communication apparatus 80a. The software protocol processing unit 30 to deal with the transmission is provided in the software processing unit 2a of the communication apparatus 80a. The communication apparatus 80a can speed up the UDP reception processing.

In this case, received data is transferred sequentially to the network controller 11a, the hardware protocol processing unit 12a, the hardware protocol process information generating unit 13a, the software protocol process resumption unit 23a, the software protocol processing unit 22a, and the application 21a. Meanwhile, transmitted data is transferred sequentially to the application 21a, the software protocol processing unit 22a, the software protocol processing unit 30, and the network controller 11a.

Note that the software protocol processing unit 22a and the software protocol processing unit 30 may be processed by the same CPU or may be processed by different processors.

Figure 8:
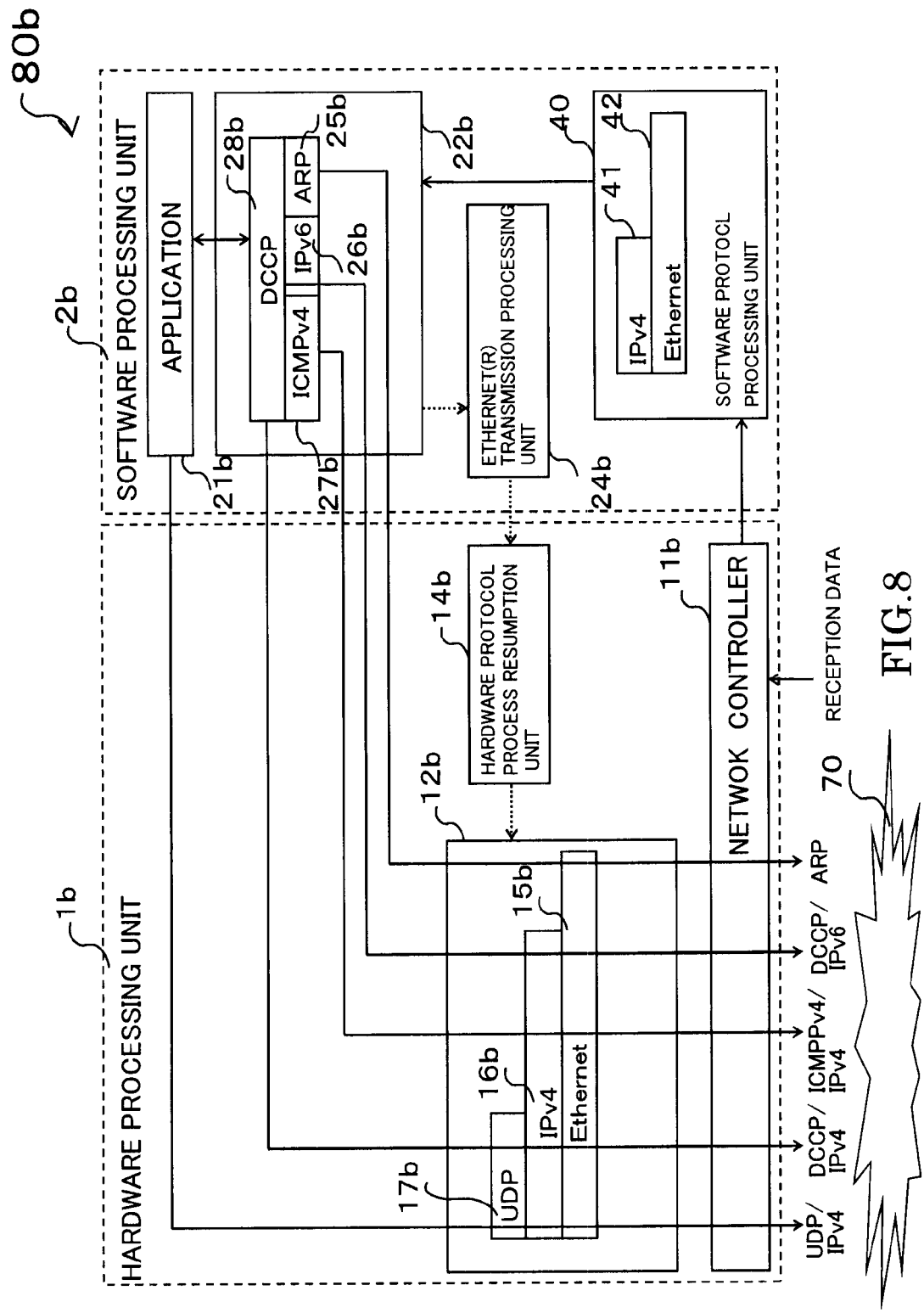
FIG. 8 is a block diagram showing the communication apparatus with faster UDP transmission according to Embodiment 1.

FIG. 8 shows a second modification of Embodiment 1. A communication apparatus 80b of the second modification includes a hardware processing unit 1b and a software processing unit 2b. The hardware processing unit 1b includes a network controller 11b, a hardware protocol processing unit 12b, and a hardware protocol process resumption unit 14b. The hardware protocol processing unit 12b includes an Ethernet (R) transmission processing unit 15b, an IPv4 transmission processing unit 16b, and a UDP transmission processing unit 17b. The software processing unit 2b includes an application 21b, a software protocol processing unit 22b, a software protocol process information generating unit 24b, and a software protocol processing unit 40. The software protocol processing unit 22b includes an ARP processing unit 25b, an IPv6 processing unit 26b, an ICMPv4 processing unit 27b, and a DCCP processing unit 28b. The software protocol processing unit 40 includes an IPv4 reception processing unit 41 and an Ethernet (R) reception processing unit 42.

In the second modification described above, the software protocol process information generating unit 24b and hardware protocol process resumption unit 14b to deal with the transmission are provided in the communication apparatus 80b. The software protocol processing unit 40 to deal with the reception is provided in the software processing unit 2b in the communication apparatus 80b. The communication apparatus 80b can speed up the UDP transmission processing.

In this case, transmitted data is transferred sequentially to the application 21b, the software protocol processing unit 22b, the software protocol process information generating unit 24b, the hardware protocol process resumption unit 14b, the hardware protocol processing unit 12b, and the network controller 11b. Meanwhile, received data is transferred sequentially to the network controller 11b, the software protocol processing unit 40, the software protocol processing unit 22b, and the application 21b.

Note that the software protocol processing unit 22b and the software protocol processing unit 40 may be processed by the same CPU or may be processed by different processors.

As described above, in the frame reception processing, the communication apparatus of the embodiment is configured so that when the frame is one that cannot be processed by the hardware protocol processing unit 12, the protocol processing that can be performed by the hardware protocol processing unit 12 is performed, and the software protocol processing unit 22 performs the upper layer protocol processing. Meanwhile, in the frame transmission processing, the communication apparatus of the embodiment is configured so that the protocol processing that can be performed by the software protocol processing unit 22 is performed, and the hardware protocol processing unit 12 performs the lower layer protocol processing. Thus, when all the protocol processing can be performed by the hardware protocol processing unit 12 and when only a part of the processing can be performed by the hardware protocol processing unit 12 in the reception and transmission, the protocol processing can be executed as fast as possible. As a result, transmission and reception throughput of the communication apparatus 80 can be significantly improved.

Moreover, the Ethernet (R) processing and the IPv4 processing are performed by the hardware protocol processing unit 12, and the Ethernet (R) processing unit and the IPv4 processing unit do not need to be provided in the software protocol processing unit 22. Thus, the software size can be reduced. Furthermore, the protocol processing using hardware and the protocol processing using software can be accordingly divided.

Note that although the physical layer and data link layer are of the Ethernet (R) standards in the embodiment, standards defined by IEEE802.11 may be employed. When IEEE802.11 is employed for the physical layer and data link layer, a control frame processing unit and a data frame processing unit may be provided in the hardware protocol processing unit 12. Moreover, a management frame processing unit may be provided in the software protocol processing unit 22.

Moreover, in the embodiment, allocation by the hardware protocol processing unit 12 and the software protocol processing unit 22 is performed by the protocol. Furthermore, an uncompleted portion is notified through the protocol process information. Thus, IPv4 fragmentation and defragmentation processing units, for example, which are limited by the notification, may be provided in the software protocol processing unit 22. Moreover, other processing units may be provided in the hardware protocol processing unit 12.

Moreover, the protocols implemented in the hardware protocol processing unit 12 may be other protocols such as HTTP (Hypertext Transfer Protocol), TCP (Transmission Control Protocol), RTP (Real-time Transport Protocol), IP sec (Security Architecture for Internet Protocol), SCTP (Stream Control Transmission Protocol), and DCCP.

Furthermore, although the communication apparatus is configured so that the software protocol processing unit 22 holds the fixed values in generation of the protocol process information, the hardware protocol processing unit 12 may hold such values.

[Embodiment 2]

Figure 9:
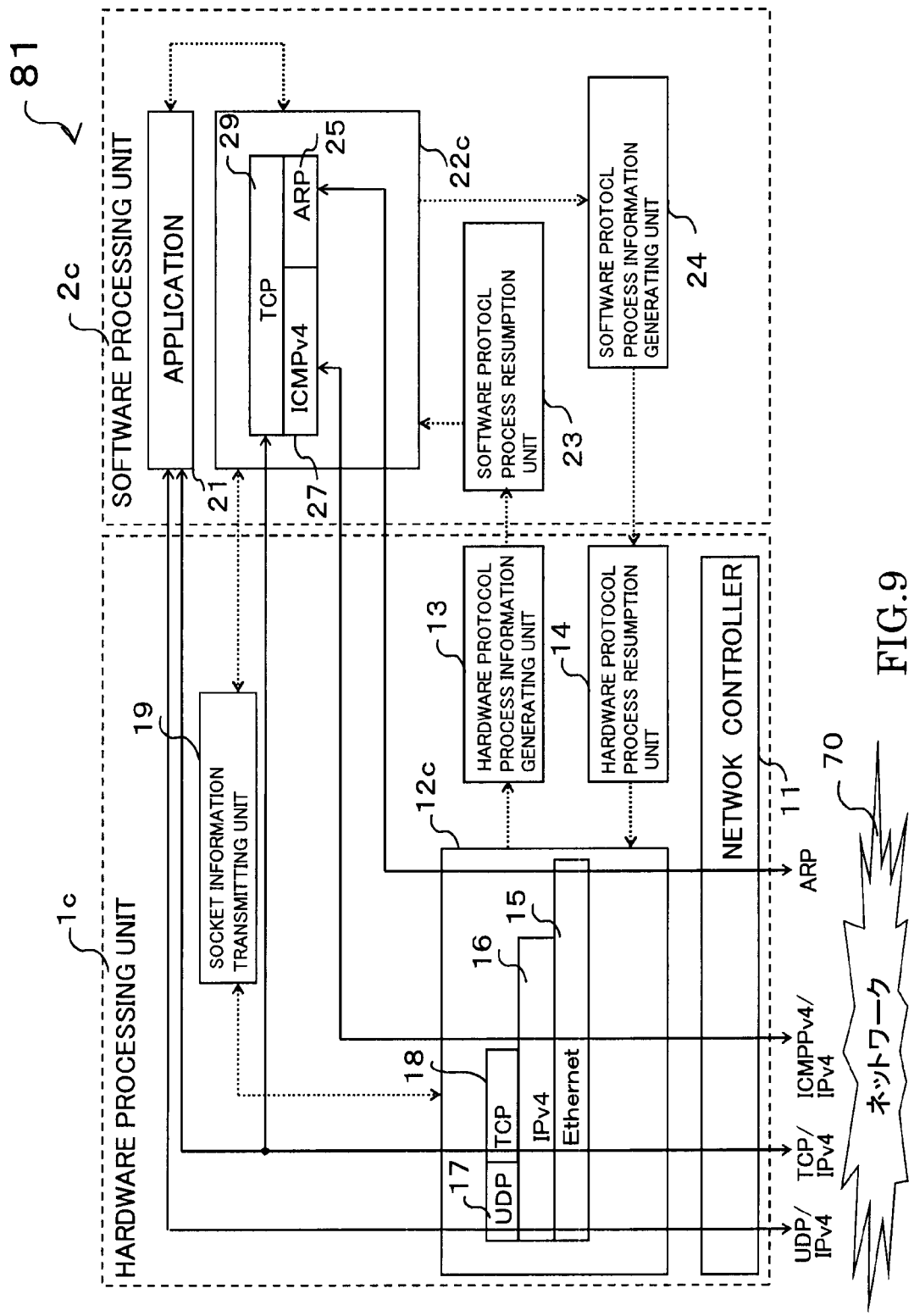
FIG. 9 is a block diagram showing a communication apparatus according to Embodiment 2.
Figure 10:
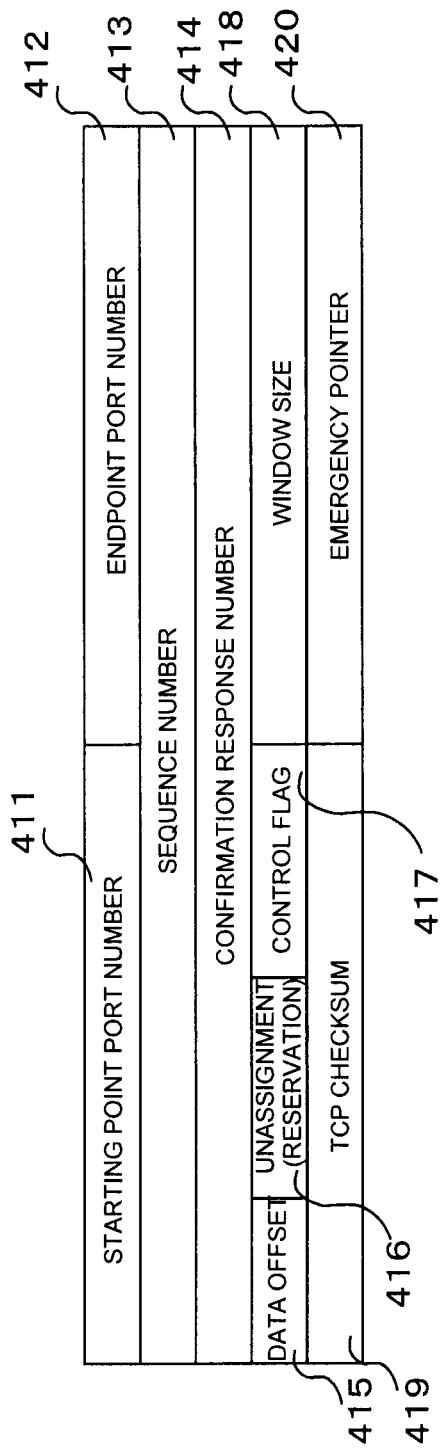
FIG. 10 is a diagram showing a configuration of a TCP header according to Embodiment 2.

Next, a communication apparatus according to Embodiment 2 will be described with reference to the drawings. FIG. 9 is a block diagram showing the communication apparatus. FIG. 10 is a diagram showing a configuration of a TCP header. FIG. 11 is a diagram showing a TCP session state. The embodiment is different from Embodiment 1 in that a socket information transmitting unit 19 is provided between a hardware protocol processing unit 12c and a software protocol processing unit 22c. Thus, the same portions as those in Embodiment 1 are denoted by the same reference numerals, and only different portions will be described while omitting description of the same portions.

The hardware protocol processing unit 12c is provided with a TCP data processing unit 18 in addition to the Ethernet (R) processing unit 15, the IPv4 processing unit 16 and the UDP processing unit 17. The software protocol processing unit 22c is provided with a TCP control processing unit 29 in addition to the ARP processing unit 25 and the ICMPv4 processing unit 27. Note that the IPv6 processing unit is removed from the software protocol processing unit 22c.

A communication apparatus 81 has a function to receive image data from a device provided in a network 70 according to TCP and to store the image data in an unillustrated disk device, and also has a function to read the image data from the disk device and to transmit the data to the device provided in the network 70 according to TCP. The communication apparatus 81 also includes the socket information transmitting unit 19 to transmit socket information to the application 21, the hardware protocol processing unit 12c and the software protocol processing unit 22c, in addition to the functions of Embodiment 1.

In the communication apparatus 81, when a port is opened to transmit or receive UDP, socket information is generated. Moreover, when a port is opened to transmit or receive TCP, socket information is generated. The socket information is set in a memory (not shown) that can be referred to by the hardware protocol processing unit 12c and the software protocol processing unit 22c.

Here, the socket information differs for each protocol. In the case of UDP, for example, values are stored, such as an IP address of the apparatus, an IP address of the other apparatus, a port number of the apparatus, a port number of the other apparatus, a session state, an address and length of a transmission buffer specified by the application, an address and length of a reception buffer specified by the application, IP service type, time to live, MTU, a MAC address of the apparatus, and a MAC address of the other apparatus. The UDP session state takes an open state or a closed state.

FIG. 10 shows an example of a TCP header. The TCP header includes, for example, a starting point port number 411, an endpoint port number 412, a sequence number 413, a confirmation response number 414, a data offset 415, an unassignment (reservation) 416, a control flag 417, a window size 418, a TCP checksum 419 and an emergency pointer 420.

For example, the starting point port number 411 is 16 bits, the endpoint port number 412 is 16 bits, the sequence number 413 is 32 bits, the confirmation response number 414 is 32 bits, the data offset 415 is 4 bits, the unassignment (reservation) 416 is 6 bits, the control flag 417 is 6 bits, the window size 418 is 16 bits, the TCP checksum 419 is 16 bits and the emergency pointer 420 is 16 bits. Note that an option or budding portion that is variable in length by 32 bits is arbitrarily provided. Examples of the control flag 417 include URG (Urgent), ACK (Acknowledge), PSH (Push), RST (Reset), SYN (Synchronize) and FIN (Finish).

In the case of TCP session information, values are set, such as the IP address of the apparatus, the IP address of the other apparatus, the port number of the apparatus, the port number of the other apparatus, the session state, the address and length of the transmission buffer specified by the application, the address and length of the reception buffer specified by the application, the IP service type, the time to live, MTU, the MAC address of the apparatus, the MAC address of the other apparatus, a sequence number (SND. UNA) transmitted but not acknowledged, a sequence number (SND. NXT) to be transmitted next, a transmission window size (SND. WND), a segment sequence number (SND. WL1) used to update the window, a segment confirmation number (SND. WL2) used to update the window, a sequence number (RCV. NXT) to be received next, and a reception window size (RCV. WND).

The TCP socket information includes information whose values are updated by the hardware protocol processing unit 12c or the software protocol processing unit 22c in segment transmission or reception.

FIG. 11 shows the TCP session state. Examples of the TCP session state include LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and CLOSED.

Figure 12:
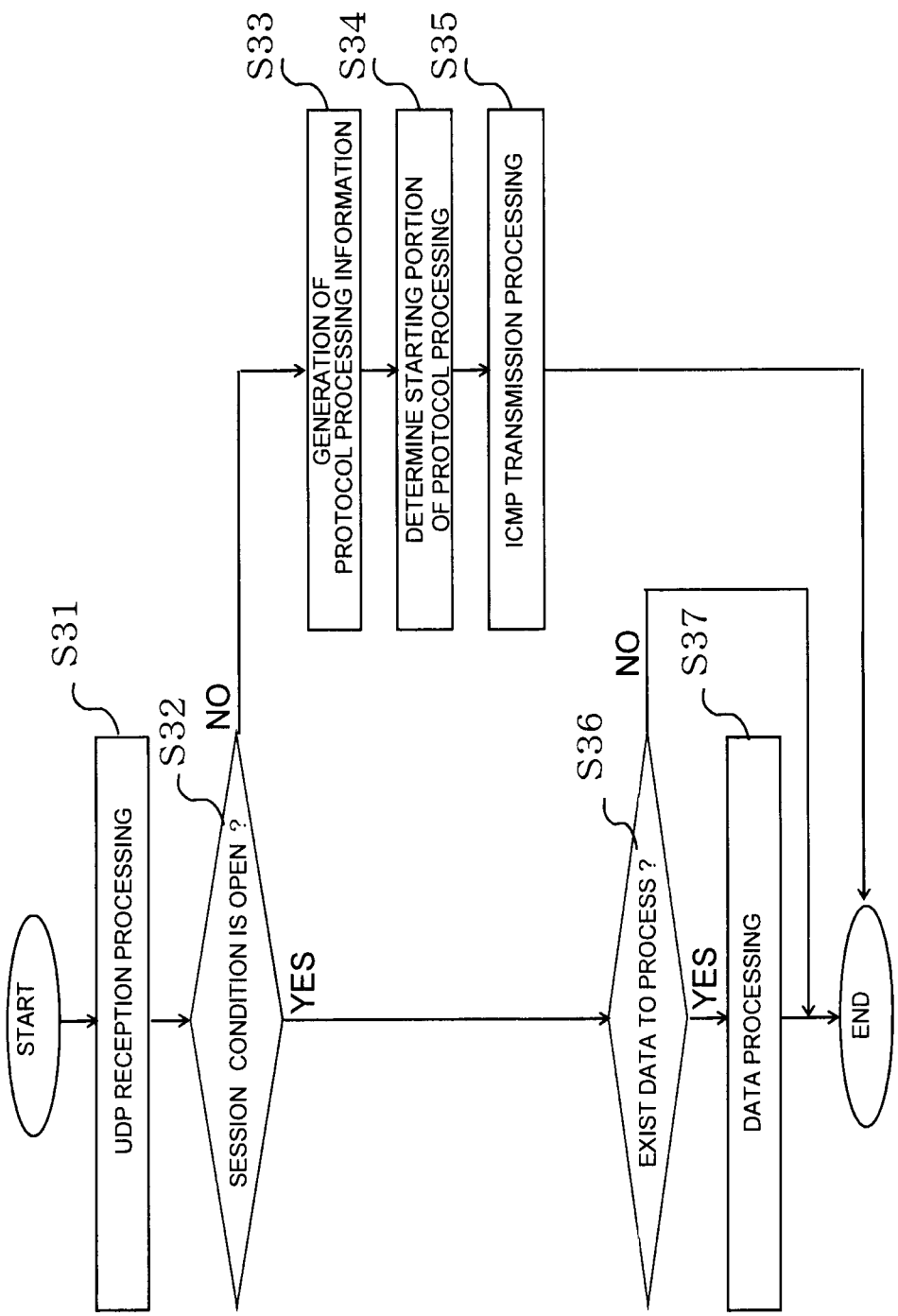
FIG. 12 is a flowchart showing UDP reception processing according to Embodiment 2.
Figure 13:
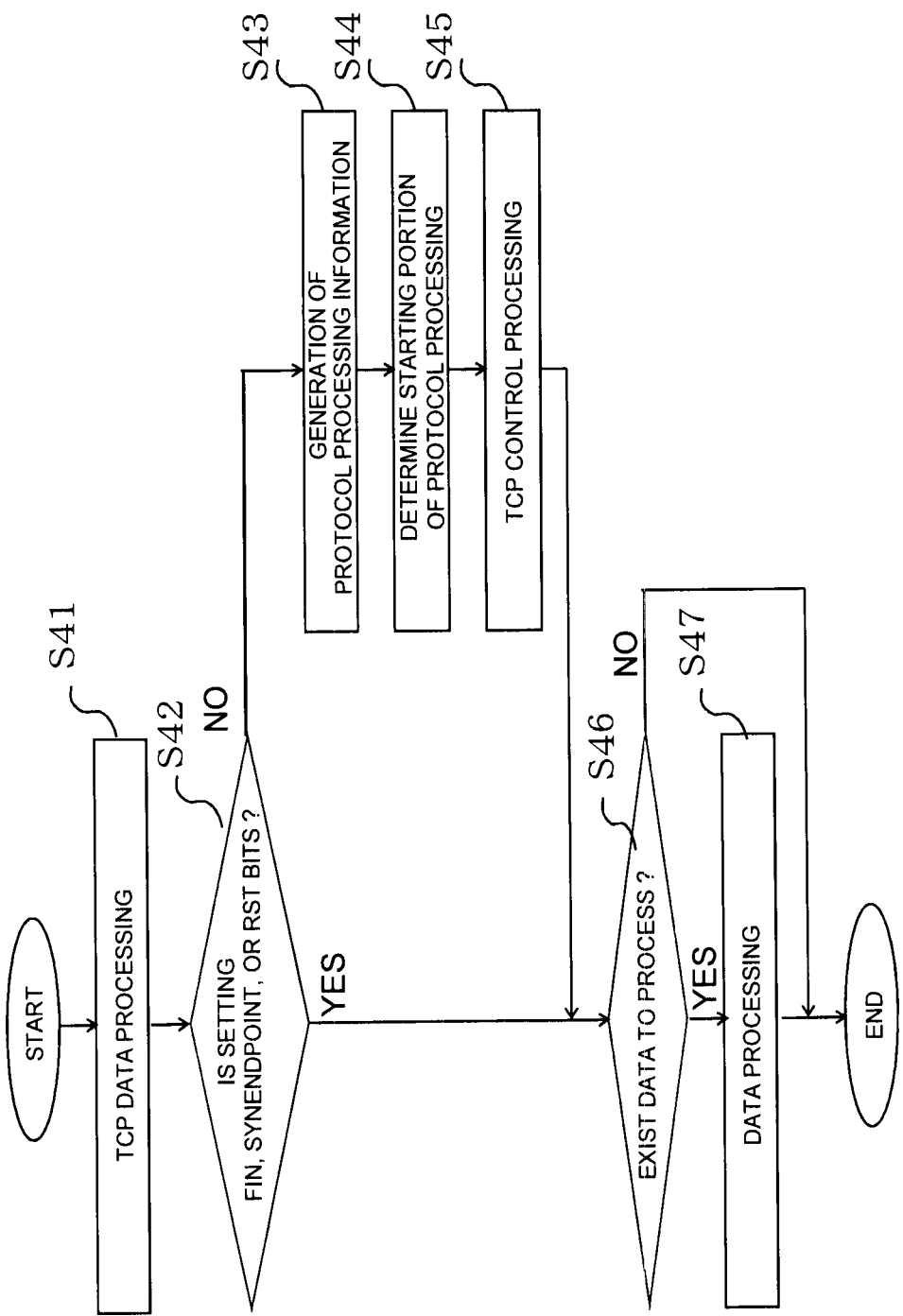
FIG. 13 is a flowchart showing TCP reception processing according to Embodiment 2.
Figure 14:
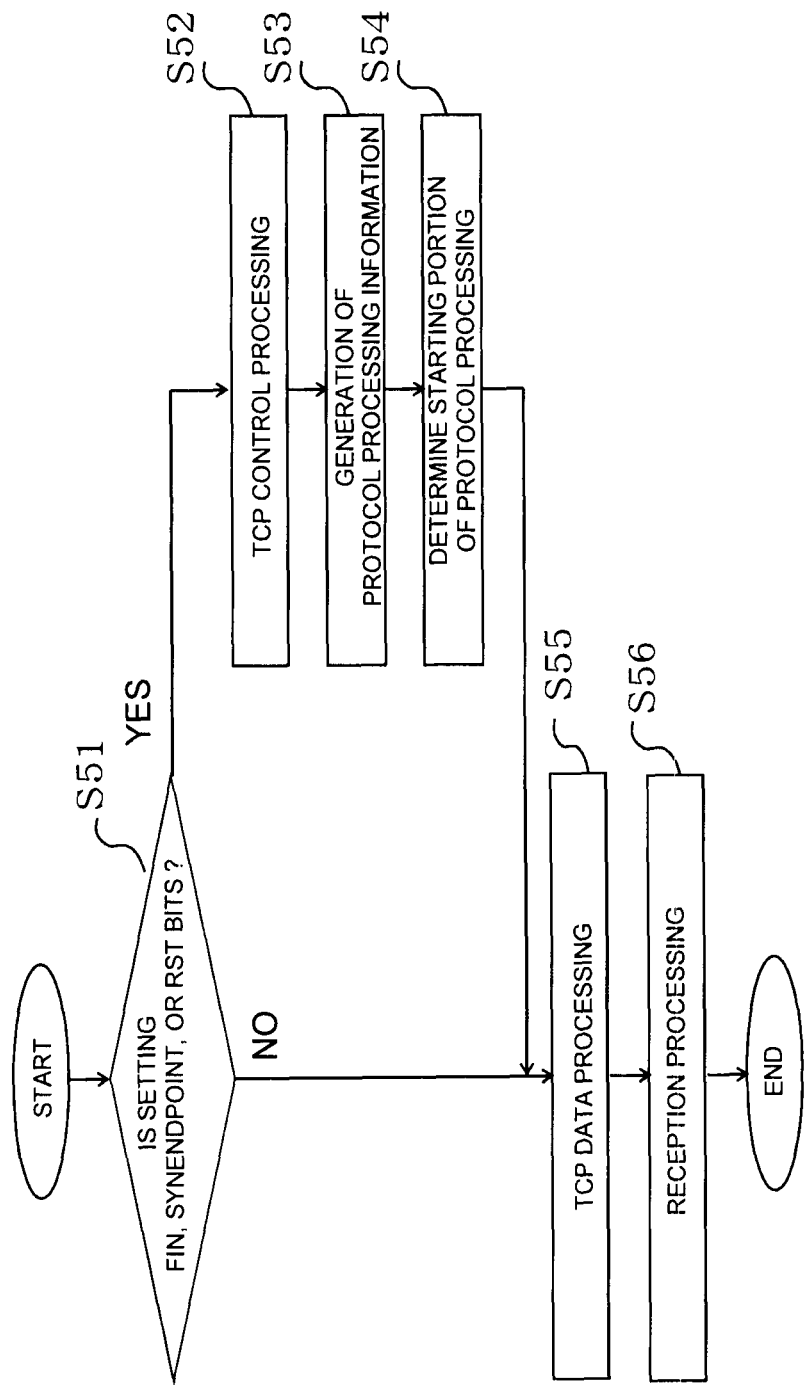
FIG. 14 is a flowchart showing TCP transmission processing according to Embodiment 2.

Next, operations of the communication apparatus according to Embodiment 2 will be described with reference to FIGS. 12 to 14. FIG. 12 is a flowchart showing UDP reception processing. FIG. 13 is a flowchart showing TCP reception processing. FIG. 14 is a flowchart showing TCP transmission processing.

The UDP reception processing by the communication apparatus 81 will be described with reference to FIG. 12. First, the network controller 11 receives an Ethernet (R) frame transmitted from the network 70. Then, the network controller 11 activates the hardware protocol processing unit 12c to perform protocol processing. Specifically, the UDP processing unit 17 performs UDP header processing to calculate the UDP packet length 313 and the UDP checksum 314 of payload. Moreover, the UDP processing unit 17 checks whether or not data is corrupted. When it is detected that the data is corrupted, the payload is discarded and the processing is terminated (Step S31). Next, the hardware protocol processing unit 12c determines whether or not the session state of the socket information is the opened state (Step S32).

When the session state of the socket information is determined to be the "closed" state, the hardware protocol process information generating unit 13 generates protocol process information to transmit "port unreachable" of ICMP (Step S33). The protocol process information is transmitted to the software protocol process resumption unit 23. The software protocol process resumption unit 23 determines start of protocol processing using software and notifies the software protocol processing unit 22c to that effect (Step S34). The ICMPv4 processing unit 27 of the software protocol processing unit 22 generates a port unreachable packet and transmits the packet to the application 21 (Step S35).

On the other hand, in the case where the session state is determined to be the "opened" state, the hardware protocol processing unit 12c determines whether or not there is received data to be processed by the application 21 (Step S36). In the case where it is determined that there is no received data to be processed by the application 21, the reception processing is terminated.

On the other hand, in the case where it is determined that there is received data to be processed by the application 21, the UDP processing unit 17 writes the received data into the reception buffer of the application 21 specified by the socket information, stores the image data in the disk device, and then terminates the processing (Step S37).

Next, the TCP reception processing by the communication apparatus 81 will be described with reference to FIG. 13. The TCP data processing unit 18 executes the following TCP reception processing. (1) When the session state of the socket information is "ESTABLISHED", a part of the TCP header is processed. (2) A checksum of the TCP segment is checked, and data is rearranged in the order of sequence number. (3) The payload is written into the reception buffer of the application 21 obtained from the socket information. (4) In the case where the ACK bit of the control flag 417 of the TCP segment is set, the acknowledged internal transmission buffer is released. (5) When the TCP segment is received, an acknowledgment segment is transmitted (Step S41).

Here, when the acknowledgment segment is generated by the TCP data processing unit 18, the IPv4 processing unit 16 and Ethernet (R) processing unit 15 in the hardware protocol processing unit 12c perform transmission processing, respectively. Thus, the acknowledgment segment is transmitted to a client device connected to the network 70 through the network controller 11.

Next, the TCP data processing unit 18 determines whether or not any of FIN, SYN and RST is set in the control flag 417 (see the control flag table shown in FIG. 10) in the TCP segment (Step S42).

When it is determined that FIN, SYN or RST is set, the hardware protocol process information generating unit 13 generates protocol process information (Step S43). The protocol process information is transmitted to the software protocol process resumption unit 23 from the hardware protocol process information generating unit 13. The software protocol process resumption unit 23 instructs the software protocol processing unit 22c to start the protocol processing using software (Step S44). The TCP control processing unit 29 of the software protocol processing unit 22c performs TCP control processing (Step S45). The TCP control processing unit 29 performs bit processing of the TCP control flag in accordance with RFC793, for example. In the case where the SYN flag, for example, is set and the session state of the socket information is LISTEN, values such as SND.NXT and RCV.NXT of the session information is set. In this event, a segment having an SYN bit and an ACK bit in the control flag is transmitted to the other apparatus, and the session state is shifted to SYN-RECEIVED. The software protocol processing unit 22c determines whether or not there is received data to be processed by the application 21 (Step S46). When there is no received data to be processed, the reception processing is terminated.

On the other hand, when there is received data to be processed, the TCP data processing unit 18 writes the received data into the reception buffer of the application 21 specified by the socket information, and the application 21 executes an operation of storing the received data in the disk device (Step S47).

Next, with reference to FIG. 14, description will be given of processing of transmitting a TCP segment from the application 21 in the communication apparatus 81. Although the TCP segment is transmitted from the application 21 here, the same goes for the case where the TCP segment is transmitted from the software protocol processing unit 22c.

First, the application 21 sets socket information required to perform the protocol processing, such as the address and length of the buffer storing transmitted data such as image information to be transmitted to the socket information, and notifies the socket information directly to the hardware protocol processing unit 12c.

Next, in the case of a segment for which only an ACK flag (=02) of the control flag 417 is to be set, the following transmission processing is executed. The software protocol processing unit 22c determines whether or not the segment is one for which FIN, SYN or RST bit of the control flag is to be set (Step S51).

When the segment is determined to be the one for which the FIN, SYN or RST bit is to be set, the TCP control processing unit 29 of the software protocol processing unit 22c performs TCP control processing including control of the TCP sequence number, generation of the TCP header, and the like (Step S52). The processing described above is performed when connection establishment or disconnection is requested by the application 21, when a segment in which the SYN bit of the control flag is set is received, when a response to the TCP segment is requested, and the like.

Next, the software protocol process information generating unit 24 generates information indicating that the protocol processing higher than IPv4 is completed, information required for IPv4 processing (the starting point IP address 221, the endpoint IP address 222 and the protocol number 219), information required for Ethernet (R) processing (the starting point MAC address 112 and the endpoint MAC address 111), and protocol process information including information on the payload and length of the payload (Step S53).

Subsequently, the protocol process information is transmitted to the hardware protocol process resumption unit 14 from the software protocol process information generating unit 24. Then, the hardware protocol process resumption unit 14 determines start of protocol processing using hardware (Step S54).

On the other hand, when the segment is determined not to be the one for which the FIN, SYN or RST bit is to be set, the hardware protocol processing unit 12c performs TCP data processing. The hardware protocol processing unit 12c performs the TCP data processing also when information is inputted from the hardware protocol process resumption unit 14 described above (Step S55). The hardware protocol processing unit 12c sets the starting point port number 411, the endpoint port number 412, the sequence number 413, the confirmation response number 414, the control flag 417, and the window size 418, based on the socket information received through the socket information transmitting unit 19. Moreover, the hardware protocol processing unit 12c calculates a data offset from the header length, and also calculates the TCP checksum 419 from the TCP header and data. The TCP header is generated from the data thus obtained.

Thereafter, the IPv4 processing unit 16 sets the values other than the header checksum 220 of the IP header (see FIG. 3). Moreover, the IPv4 processing unit 16 calculates the header checksum 220 and sets the header checksum in the checksum field.

Subsequently, the Ethernet (R) processing unit 15 sets the starting point MAC address 112, the endpoint MAC address 111 and the type 113 of the Ethernet (R) frame (see FIG. 2) (Step S55).

Lastly, the network controller 11 adds the FCS 115 to the Ethernet (R) frame. The Ethernet (R) frame thus generated is modulated, and the transmitted data is transmitted to the destination apparatus through the network 70 (Step S56).

When the transmitted data is packet-transmitted from the application 21 or the software protocol processing unit 22c, it is first determined whether or not the packet is one in which a bit other than the ACK bit is to be set in the control flag of the TCP segment. In the case where the segment is one having only the ACK bit set in the control flag, all the protocol processing is performed by the hardware protocol processing unit 12c. Thus, the software protocol processing unit 22c does not perform the protocol processing.

On the other hand, in the case where the segment is one in which a bit other than the ACK bit is to be set in the control flag, at least a part of the protocol processing is performed by the software protocol processing unit 22c. In this case, the hardware protocol processing unit 12c performs the protocol processing using the protocol process information generated by the software protocol process information generating unit 24. In this event, the protocol process information includes information indicating a portion for which the protocol processing is completed by the software protocol processing unit 22c, the values obtained, and the like. The hardware protocol processing unit 12c does not perform the protocol processing already executed by the software protocol processing unit 22c, but performs only the protocol processing not executed by the software protocol processing unit 22c.

Although the software protocol processing unit 22c performs the TCP control processing related to session establishment in Embodiment 2, the hardware protocol processing unit 12c may change the session state from the SYN-SENT state or the SYN-RECEIVED state to the ESTABLISHED state. Thus, even when the data is received immediately after the session is established, all the data can be received.

Moreover, while the hardware protocol processing unit 12c performs the TCP acknowledgment segment transmitting processing, the software protocol processing unit 22c may perform the processing that transmission intervals of the acknowledgment segment is extended. Thus, a circuit to transmit the acknowledgment segment can be omitted.

Although the hardware protocol processing unit 12c performs all the data transmission processing, the software protocol processing unit 22c may perform retransmission processing. Since the retransmission processing occurs less frequently in a network having a low loss rate, fast protocol processing can be achieved while reducing a circuit required for retransmission.

Moreover, in the reception processing, the hardware protocol processing unit 12c may receive the segments with consecutive sequence numbers, and the software protocol processing unit 22c may receive the segments with non-consecutive sequence numbers. In a network in which a shift in packet order occurs less frequently, the circuit of the hardware protocol processing unit 12c can be simplified, and thus fast protocol processing can be achieved.

Furthermore, although the MAC address of the own apparatus and the MAC address of the other apparatus are shared by the hardware protocol processing unit 12c and the software protocol processing unit 22c through the session information, the MAC addresses may be referred to from the IP address when the hardware protocol processing unit 12c performs the transmission processing. In this case, such a configuration can be implemented by providing a routing table in the software protocol processing unit 22c.

As described above, in the communication apparatus of the embodiment, the states of the hardware protocol processing unit 12c and the software protocol processing unit 22c can be synchronized by performing the protocol processing using the socket information. Accordingly, data processing with a high operation rate can be performed by the hardware protocol processing unit 12c, while the control processing with a low operation rate can be performed by the software protocol processing unit 22c. Thus, the circuit size of the hardware protocol processing unit 12c can be suppressed, and the transmission and reception throughput of the communication apparatus can be significantly improved.

Moreover, the Ethernet (R) processing, IPv4 processing and TCP data processing are performed by the hardware protocol processing unit 12c, and the software protocol processing unit 22c does not need to include the same processing unit. Thus, the software size can be reduced.

The invention is not limited to the embodiments described above, but various design changes can be made without departing from the gist of the invention. Also, Embodiments 1 and 2 may be accordingly combined.

The communication apparatus in accordance with the embodiments can be achieved by using a general-purpose computer, for example, as a basic hardware. Moreover, it is preferable to arbitrarily use a storage medium such as a memory, hard disk, CD-R, CD-RW, DVD-RAM and DVD-R, which are included in or externally attached to the communication apparatus according to the embodiments.

What is claimed is:

1. A communication apparatus, comprising:
   a hardware protocol processing unit to perform protocol processing by use of hardware for a frame of received data, the protocol processing being altered in accordance with contents of the frame;
   a software protocol processing unit to perform protocol processing using software for the frame of the received data, the software protocol processing unit implemented by hardware different from that of the hardware protocol processing unit;
   a hardware protocol process information generating unit to generate protocol process information with respect to each frame of the received data, the protocol process information including any of first information which indicates the protocol processing completed by the hardware protocol processing unit and second information which indicates the protocol processing to be done by the software protocol process unit, and values which are obtained by the protocol processing performed by the hardware protocol processing unit; and
   a software protocol process resumption unit to cause the software protocol processing unit to perform the protocol processing not completed by the hardware protocol processing unit, using the protocol process information.

2. The communication apparatus according to claim 1, wherein
   the protocol process information includes a protocol identifier of a layer higher than the layer for which the processing is completed by the hardware protocol processing unit, and
   the software protocol process resumption unit causes the software protocol processing unit to perform upper layer protocol processing.

3. A communication apparatus according to claim 1, wherein
   hardware protocol processing to be done by the hardware protocol processing unit and software protocol processing to be done by the software protocol processing unit are performed by sharing each other protocol processing of the hierarchy which is equal to or lower than the transport layer.

4. A communication apparatus according to claim 1, wherein
   protocol processing, which is differed in accordance with contents of the frame, is performed by the hardware protocol processing unit, the protocol processing is protocol processing of the hierarchy which is differed in accordance with contents of the frame.

5. A communication apparatus according to claim 1, wherein
   protocol processing, which is performed by the software protocol processing unit, is protocol processing which is not possible to perform by the hardware protocol processing unit.

6. A communication apparatus, comprising:
   a software protocol processing unit to perform protocol processing by use of software for a frame of transmitted data, the protocol processing being altered in accordance with contents of the frame;
   a hardware protocol processing unit to perform protocol processing using hardware for the frame of the transmitted data, the hardware protocol processing unit implemented by hardware different from that of the software protocol processing unit;
   a software protocol process information generating unit to generate protocol process information with respect to each frame of the transmitted data, the protocol process including any of first information which indicates the protocol processing completed by the software protocol processing unit and second information which indicates the protocol processing to be done by the software protocol process unit, and values which is obtained by the protocol processing by performed by the software protocol processing unit; and
   a hardware protocol process resumption unit to cause the hardware protocol processing unit to perform the protocol processing not completed by the software protocol processing unit, using the protocol process information.

7. The communication apparatus according to claim 6, wherein
   the protocol process information includes a protocol identifier of a layer lower than the layer for which the processing is completed by the software protocol processing unit, and the hardware protocol process resumption unit causes the hardware protocol processing unit to perform lower layer protocol processing.

8. A communication apparatus according to claim 6, wherein
hardware protocol processing to be done by the hardware protocol processing unit and software protocol processing to be done by the software protocol processing unit are performed by sharing each other protocol processing of the hierarchy which is equal to or lower than the transport layer.

9. A communication apparatus according to claim 6, wherein
protocol processing, which is differed in accordance with contents of the frame, is performed by the hardware protocol processing unit, the protocol processing is protocol processing of the hierarchy which is differed in accordance with contents of the frame.

10. A communication apparatus according to claim 6, wherein
protocol processing, which is performed by the software protocol processing unit, is protocol processing which is not possible to perform by the hardware protocol processing unit.

11. A communication apparatus, comprising:
a hardware protocol processing unit to perform protocol processing using hardware for a frame of received data and a frame of transmitted data;
a software protocol processing unit to perform protocol processing using software for the frame of the received data and the frame of the transmitted data, the software protocol processing unit implemented by hardware different from that of the hardware protocol processing unit;
a hardware protocol process information generating unit to generate protocol process information in reception, the protocol process information including information which indicates a portion for which the protocol processing is completed by the hardware protocol processing unit, and values which are obtained by the protocol processing performed by the hardware protocol processing unit;
a software protocol process resumption unit to cause, in reception, the software protocol processing unit to perform the protocol processing not completed by the hardware protocol processing unit, using the protocol process information generated by the hardware protocol process information generating unit;
a software protocol process information generating unit to generate protocol process information in transmission, the protocol process information including information which indicate a portion for which the protocol processing is completed by the software protocol processing unit, and values which are obtained by the protocol processing performed by the software protocol processing unit; and
a hardware protocol process resumption unit to cause, in transmission, the hardware protocol processing unit to perform the protocol processing not completed by the software protocol processing unit, using the protocol process information generated by the software protocol process information generating unit.

12. The communication apparatus according to claim 11, wherein
the hardware protocol processing unit includes an Ethernet processing unit, an IP processing unit and a UDP processing unit,
the protocol process information includes at least one of completion/non-completion of various processing by the hardware protocol processing unit, a starting point MAC address, an endpoint MAC address, a type, a starting point IP address, an endpoint IP address, a length, a protocol number and a payload, and
the software protocol processing unit includes a protocol processing unit other than the Ethernet processing unit, the IP processing unit and the UDP processing unit among processing units for communication protocols.

13. The communication apparatus according to claim 11, wherein
the hardware protocol processing unit includes an Ethernet processing unit, an IP processing unit, a UDP processing unit and a TCP data processing unit,
the protocol process information includes at least one of completion/non-completion of various processing by the hardware protocol processing unit, a TCP control flag, a sequence number, a confirmation response number, a starting point IP address, an endpoint IP address, a starting point port number and an endpoint port number, and
the software protocol processing unit includes a TCP control processing unit to perform flag processing for SYN, FIN or RST of a control flag of a TCP segment, among TCP processing.

14. The communication apparatus according to claim 11, further comprising:
a socket information transmitting unit to transmit socket information, between the hardware protocol processing unit and the software protocol processing unit,
wherein the hardware protocol processing unit or the software protocol processing unit performs protocol processing using the socket information.

15. The communication apparatus according to claim 13, wherein
the TCP data processing unit receives segments with consecutive sequence numbers, and
the software protocol processing unit receives segments with non-consecutive sequence numbers.

16. The communication apparatus according to claim 13, wherein
the TCP data processing unit performs data transmission processing other than retransmission, and
the software protocol processing unit performs data transmission processing for retransmission.

* * * * *